Sept. 30, 1969 T. FELDMAN 3,470,535

ELECTRICALLY CONTROLLED MATRIX

Filed Feb. 28, 1966

INVENTOR
THEODORE FELDMAN

BY Delbert P. Warner

ATTORNEY 3,470,535
ELECTRICALLY CONTROLLED MATRIX
Theodore Feldman, Long Branch, N.J., assignor to International Telephone & Telegraph Corporation, New York, N.Y., a corporation of Delaware
Filed Feb. 28, 1966, Ser. No. 530,708
Int. Cl. H04q 1/18
U.S. Cl. 340—166 11 Claims

ABSTRACT OF THE DISCLOSURE

An electrical translator is provided by a matrix formed by two sets of wires positioned to cross each other at a plurality of points. Variable resistance devices having switch-like "conduct" and "non-conduct" characteristics are used as crosspoints at each of the points. Control of the variable resistance devices is by electric signals which determine the conductivity of each cross-point individually to enable extensive changes in the translator without rewiring.

This invention relates to the control of switching matrices made up of conductors interconnected at crossing points and particularly to the control of such matrices through the use of electrically controlled variable resistance devices interconnected at the crossing points. More particularly, the invention has application to electrically settable translator and storage matrices.

In the prior art, matrices have been used in translators and in radix converters, i.e., in devices for receiving intelligence encoded in one code, or in one radix, and transmitting it in another code, or to another radix, without change in substance. Among the more successful of these prior art devices have been translators made of a matrix of conductors, certain of which have been connected together through diodes at points where they cross each other. The diodes have been biased selectively to conduct when signals of the proper polarity and amplitude are applied to them over receiving connections. Similar arrays of magnetic cores connecting input signals to selected outputs have been used as information storage devices.

These prior art devices share a common limitation, i.e., they are all relatively inflexible in the sense that they can be made to vary in resistance between terminals, or in other electrical properties, only by making mechanical changes in their connections. As an example of this inflexibility, in order to change electrical connections between one line and another as determined by a conventional diode it has been necessary to remove the diode or replace it with another diode. Similarly, with cores used in a matrix to form a memory, if it is desired to alter the character of the memory device itself, either the nature, the position, or the number of cores must be altered. It is a primary object, therefore, of the present invention to provide means for changing, by the application of electricity, the values of resistance or other characteristics of various components connected as the crosspoints of a matrix made up of electrical conductors.

It is a second object of this invention to provide a matrix of electrical conductors coupled at crosspoints through couplings, the characteristics of which may be varied by heat generated in accordance with discrete signals.

The foregoing objects and others ancillary thereto are accomplished according to preferred embodiments of this invention by the use of matrices composed of electrical conductors. In preferred examples, the conductors composing a primary matrix are coupled at their crosspoints by connectors having variable values of resistance. The variations in resistance of the resistors in turn are controlled by the application of certain "setting" potentials which generate heat to provide for direct control of resistance. The setting potentials may be applied over a separate matrix, or they may be applied, with proper connections, over portions of the primary matrix.

The novel features characteristic of this invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1:
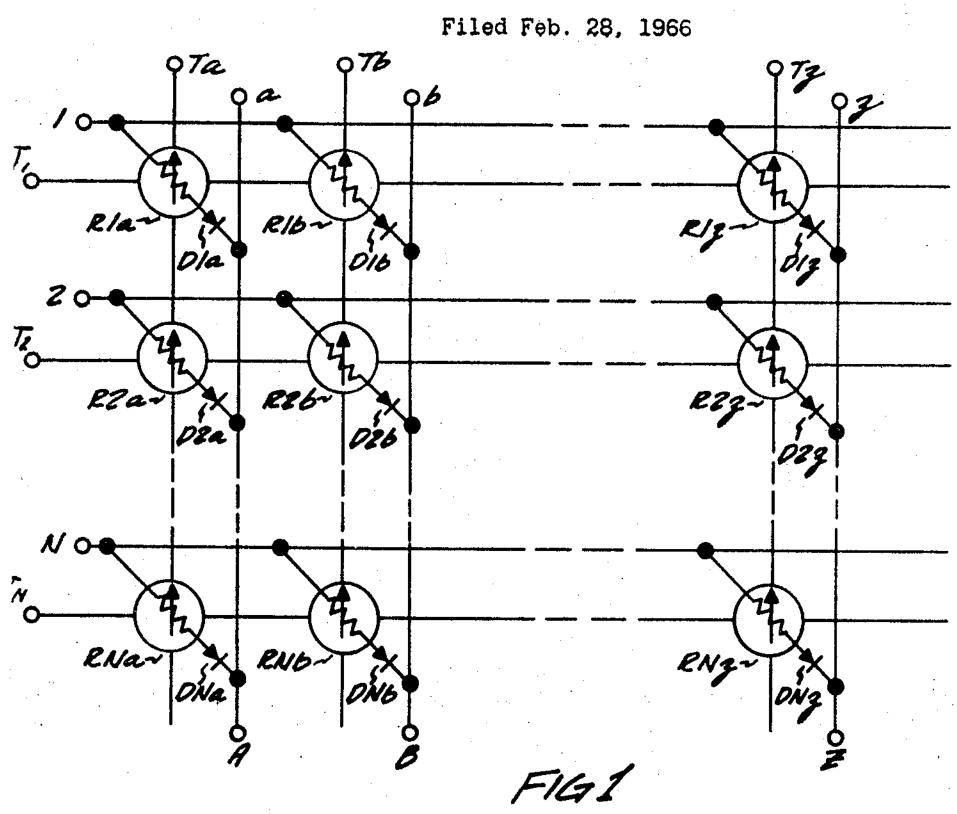
FIG. 1 is a diagram of a matrix of conductors arranged in accordance with one aspect of the invention.

Turn now to FIG. 1 for a brief description of an embodiment of the invention and also for a description of the prior art. The horizontal conductors 1, 2 . . . N and vertical conductors *a*, *b* . . . *z* cross each other to form arrays in a well known manner. At each crossing point such as are found at 1*a*, 1*b*, 2*a*, 2*b*, etc., a connection is made through a resistor R1*a*, R1*b*, R2*a*, etc. and a corresponding diode D1*a*, D1*b*, D2*a*, D2*b*, etc. Assuming that the resistors R1*a*, R1*b*, etc. are fixed resistors of a suitable size, fixed biasing potentials may be applied as "priming" potentials between terminals 1, 2, 3. . . N, and terminals *a*, *b* . . . *z*, respectively. Once properly primed, additional potentials on selected ones of terminals *a*, *b* . . . *z* or terminals 1, 2, 3 . . . N, respectively, will tend to cause conduction between corresponding horizontal wires 1, 2 . . . N and output leads A, B . . . Z.

The operation of the matrix of FIG. 1, assuming the conditions of the last paragraph, is like that of a conventional matrix to the extent that signals may be supplied on the simultaneous occurrence of signals on a row of conductors and a column of conductors connected through diodes at selected crossing points. However, the circuit of FIG. 1 offers additional possibilities which have not been described heretofore, since it includes variable resistors or conductors R1*a*, R2*a*, R1*b*, R2*b* . . . RN*z*, instead of fixed resistors. Furthermore, the conductivity of these resistors may be controlled by heat applied in proportion to the flow of current between selected terminals of the matrix of conductors connecting to terminals T1, T2 . . . TN and/or terminals T*a*, T*b* . . . Tz. The particular variable resistors or variable conductors may be arsenic-tellurium-iodine glasses, referred to herein as of the Pearson type, and shown in Patent No. 3,117,013 to Northover and Pearson. A number of other materials which may be used are known. Among these are: gallium arsenide with various dopings, manganese oxide, cobalt oxide, nickel oxide, gallium arsenide glasses, and arsenic-sulphur-bromine glasses. The particular material chosen will affect the on-to-off ratio, the switching time, the power dissipation required, the ability to withstand voltage breakdown when "off" and the current carrying capacity when "on." Reference to "Pearson material" in this disclosure will be understood to mean any known material having similar properties. These additional variable resistor elements make it possible to introduce wholly new conditions and to provide much more flexible matrices than have been possible up to now. For example, if the variable resistors are Pearson devices, they can be made conductive or non-conductive in accordance with a third set of signals, which may represent a selective code. Thus, output signals will be controlled as a result of potentials applied to three or four sets of conductors, instead of by potentials applied to the usual two sets to determine which of the terminals A, B . . . Z will be graced by output signals.

The embodiment of the invention shown in FIG. 1 may be used as a translator which can accept signals in one code, such as a binary code, and translate them to another code, such as the well known Gray code. The presence of the variable resistors makes possible the introduction of a third set of variables in the form of a third set of input signals (or even a fourth set) so that the translator can be modified by electrical means to translate different codes or to change from one radix conversion to another. This embodiment of the invention may be used to translate called signals, such as telephone numbers, from one form to another in order to route telephone calls in a desired way. It can also be used to control the path of any data supplied in the form of electrical signals in parallel, as in a parallel data processing system.

The embodiment of the invention shown in FIG. 1 may also serve as a memory matrix with Pearson devices at R1*a*, R1*b*, R2*a*, etc., serving as memory elements. In this connection, the multistable character of Pearson devices is employed by switching the Pearson devices between high and low resistance stages by the application of voltage pulses on pairs of terminals T1, T2 . . . TN and T*a*, T*b* . . . T*z* to heat the resistors and alter their conductivity.

In the embodiments of FIG. 1 the diodes D1*a*, D1*b* . . . etc. will tend to prevent conduction in any but one direction. The use of diodes for this purpose appears desirable in many cases in order to reduce the requirements placed on the variable resistor devices R1*a*, R1*b* . . . etc. It will be apparent, however, that a matrix of conductors like that shown in FIG. 1 can function without diodes providing only that quality control of the variable resistor devices is held at a high level. The matrix can be employed to provide crosspoints for speech circuits, if the diodes are removed. As indicated above, for such usage the variable resistors must be more carefully selected than if diodes are permitted. Pairs of crosspoints having oppositely biased diodes could also be used to provide such speech crosspoints. Usage of such a matrix in either form in telephone circuits appears to be very promising.

Figure 2:
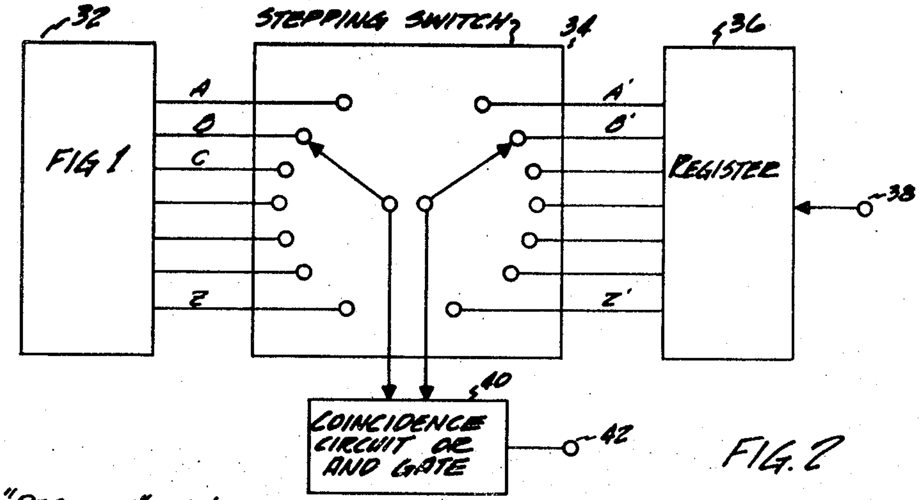
FIG. 2 is a diagram illustrating another embodiment of the invention.

The embodiment of the invention disclosed thus far can be used more effectively in some cases with the help of additional components to perform various functions. For example, the embodiment shown in FIG. 1 can be used as illustrated in the block diagram of FIG. 2 to form a matching type store. In FIG. 2 the memory or translating function of FIG. 1 is illustrated in the block diagram of FIG. 2 to form a matching type store. In FIG. 2 the memory or translating function of FIG. 1 is illustrated in block 32 with the vertical lines terminating at A, B, C . . . Z extending to a stepping switch at 34. A register 36 is also connected to the stepping switch 34 through corresponding terminals A′, B′ . . . Z′. A coded signal may be applied from a terminal 38 to the register. The stepping switch 34 can then be caused to wipe corresponding terminals such as B and B′ and a comparison can be made of the resulting signals in a coincidence circuit or an AND gate 40. With this arrangement, an output signal will be supplied at a terminal 42 only when a signal received from 32 corresponds to that stored in the register 36.

Besides providing for additional functions, an arrangement such as that shown in FIG. 2 provides greater flexibility than is possible with circuits corresponding to the diagram of FIG. 1 alone. The block 32, for example, represents either a complete translator or a memory which may be set or reset independently of the stepping switch 34 or of the register 36. Thus it is possible to change the conductivity of various resistors represented by block 32 and produce a change in the values represented without interfering with the operation of the remainder of the circuit.

Figure 3:
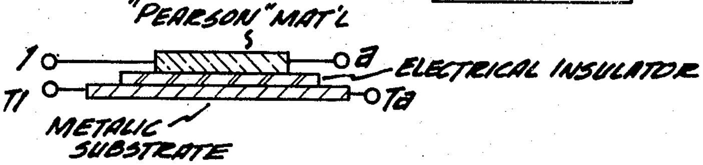
FIG. 3 is a block diagram illustrating an embodiment of a variable resistor device of use in the invention.

The resistors R1*a*, R2*a*, R1*b*, R2*b*, etc. used in embodiments of the present invention may be combined with other elements so that they differ somewhat from the devices apparently contemplated by the Northover and Pearson patent previously referred to. In these embodiments heat is used to control the resistance instead of current or voltage directly. Accordingly, a preferred embodiment may employ variable resistors constructed in accordance with the diagram in FIG. 3 which shows a sectional view of an exemplary device having a metallic substrate connected to terminals such as T1 and T*a*. The "Pearson" material may be placed in contact with the metallic substrate by an insulating body. Appropriate terminals such as 1 and *a* are then connected to the Pearson material. Heat resulting from current flow between terminals T1 and T*a* will then reduce the resistance of the corresponding resistor and prepare it to conduct and produce an output sigial on a terminal A (FIG. 1) if signals of the right character are present across terminals 1 and *a*. It is possible, of course, to design the system so that terminals 1 and T or T*a* and *a* may be connected in pairs to reduce the number of distinct terminals in the system.

For purposes of illustration, simple blocks have been employed to represent well known circuits which may be used in embodiments of the present invention. For example, an electromechanical device has been shown to represent a stepping switch, and an electromechanical device might be used as the register 36, but it will be recognized that an all-electronic circuit of conventional logic circuits could be used to take advantage of the speed inherent in such electronic circuits and in components such as are shown in FIG. 1.

What is claimed is:

1. An electrically settable switching device comprising:
a matrix composed of conductors crossing each other at a plurality of crosspoints,
variable resistor means interconnecting each of said crosspoints,
said variable resistor means being subject to individual control and being separately settable to semi-permanent conductive or nonconductive states,
said variable means being set to a conductive state as the direct result of heat generated by said potentials for setting said variable means, and
means connected to receive signals for setting each of said variable means individually to a desired state.

2. An electrically settable switching device substantially as claimed in claim 1, in which
unidirectional devices are connected in series with each of said variable means.

3. An electrically settable switching device substantially as claimed in claim 1, in which
each variable means is connected by two separate terminals to two crosspoints, and
said means to receive signals for setting each of said variable means includes an additional terminal on each variable means.

4. A coordinate switching system comprising:
a plurality of conductors crossing one another,
interconnecting means interconnecting said conductors,
said interconnecting means including a signal controlled bidirectional resistor device,
the signal controlled bidirectional resistor device responding to heat produced by a signal to alter its conductive state, and
means connected to said signal controlled bidirectional resistor device to receive control signals.

5. A coordinate switching system substantially as claimed in claim 4, in which
said interconnecting means includes a unidirectional device in series with said signal controlled bidirectional resistor device.

6. A coordinate switching system substantially as claimed in claim 4 in which:

said interconnecting means includes first and second terminal connections to said bidirectional resistor device, and said means connected to said signal controlled bidirectional resistor to receive control signals includes a third terminal connection.

7. A coordinate switching system comprising:

a plurality of conductors arrayed in a matrix to cross one another at crossover points, interconnecting means including first and second terminals for interconnecting said conductors at said crossover points, said interconnecting means including bidirectional resistor devices responsive to signals to switch their degree of conductivity, the signal controlled bidirectional resistor devices responding to heat produced by signals to alter their respective conductive states, and means connected to selectively receive signals to activate selected ones of said bidirectional resistor devices.

8. A coordinate switching system substantially as claimed in claim 7, in which said interconnecting means includes a unidirectional device in series with each of said bidirectional resistor devices.

9. A coordinate switching system substantially as claimed in claim 7, in which said interconnecting means includes independent terminal connections to said bidirectional resistor devices, and said means connected to receive signals to activate selected ones of said bidirectional resistor devices include said independent terminal connections.

10. An electrically settable switching device comprising:

a first matrix composed of first conductors and second conductors crossing each other at a plurality of crosspoints, variable means interconnecting each of said crosspoints, said variable means being settable to semi-permanent conductive or nonconductive states, and a second matrix composed of third conductors and fourth conductors crossing each other and coupling directly to the variable means, the second matrix providing paths over which potentials may be supplied to provide direct control of the status of conductivity of the individual variable means.

11. An electrically settable switching device substantially as claimed in claim 10, in which said variable means are set to a conductive state as the direct result of heat generated by said potentials for setting said variable means.

References Cited

UNITED STATES PATENTS

| | | | |
|---|---|---|---|
| 2,889,537 | 6/1959 | Elliott | 340—166 |
| 2,976,520 | 3/1961 | Reenstra | 340—176 |
| 3,152,258 | 10/1964 | Heetman | 340—166 XR |

FOREIGN PATENTS

| | | |
|---|---|---|
| 301,804 | 10/1932 | Italy. |

DONALD J. YUSKO, Primary Examiner